(12) United States Patent
O'Connor et al.

(10) Patent No.: US 9,218,204 B2
(45) Date of Patent: Dec. 22, 2015

(54) PROCESSING ENGINE FOR COMPLEX ATOMIC OPERATIONS

(71) Applicant: Advanced Micro Devices, Inc., Sunnyvale, CA (US)

(72) Inventors: James M. O'Connor, Austin, TX (US); Michael J. Schulte, Austin, TX (US); Nuwan S. Jayasena, Sunnyvale, CA (US); Gabriel H. Loh, Bellevue, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 368 days.

(21) Appl. No.: 13/725,724

(22) Filed: Dec. 21, 2012

(65) Prior Publication Data
US 2014/0181421 A1   Jun. 26, 2014

(51) Int. Cl.
 *G06F 9/50* (2006.01)
 *G06F 9/52* (2006.01)

(52) U.S. Cl.
 CPC ............... *G06F 9/50* (2013.01); *G06F 9/526* (2013.01); *G06F 2209/521* (2013.01); *G06F 2209/522* (2013.01)

(58) Field of Classification Search
 None
 See application file for complete search history.

(56) References Cited

U.S. PATENT DOCUMENTS

| 6,112,282 A * | 8/2000 | Lynch ........................... 711/145 |
| 2010/0332769 A1 * | 12/2010 | Martin .......................... 711/147 |
| 2014/0025884 A1 * | 1/2014 | Stark et al. .................... 711/109 |

* cited by examiner

*Primary Examiner* — Gary Portka
(74) *Attorney, Agent, or Firm* — Park, Vaughan, Fleming & Dowler LLP

(57) ABSTRACT

A system includes an atomic processing engine (APE) coupled to an interconnect. The interconnect is to couple to one or more processor cores. The APE receives a plurality of commands from the one or more processor cores through the interconnect. In response to a first command, the APE performs a first plurality of operations associated with the first command. The first plurality of operations references multiple memory locations, at least one of which is shared between two or more threads executed by the one or more processor cores.

21 Claims, 10 Drawing Sheets

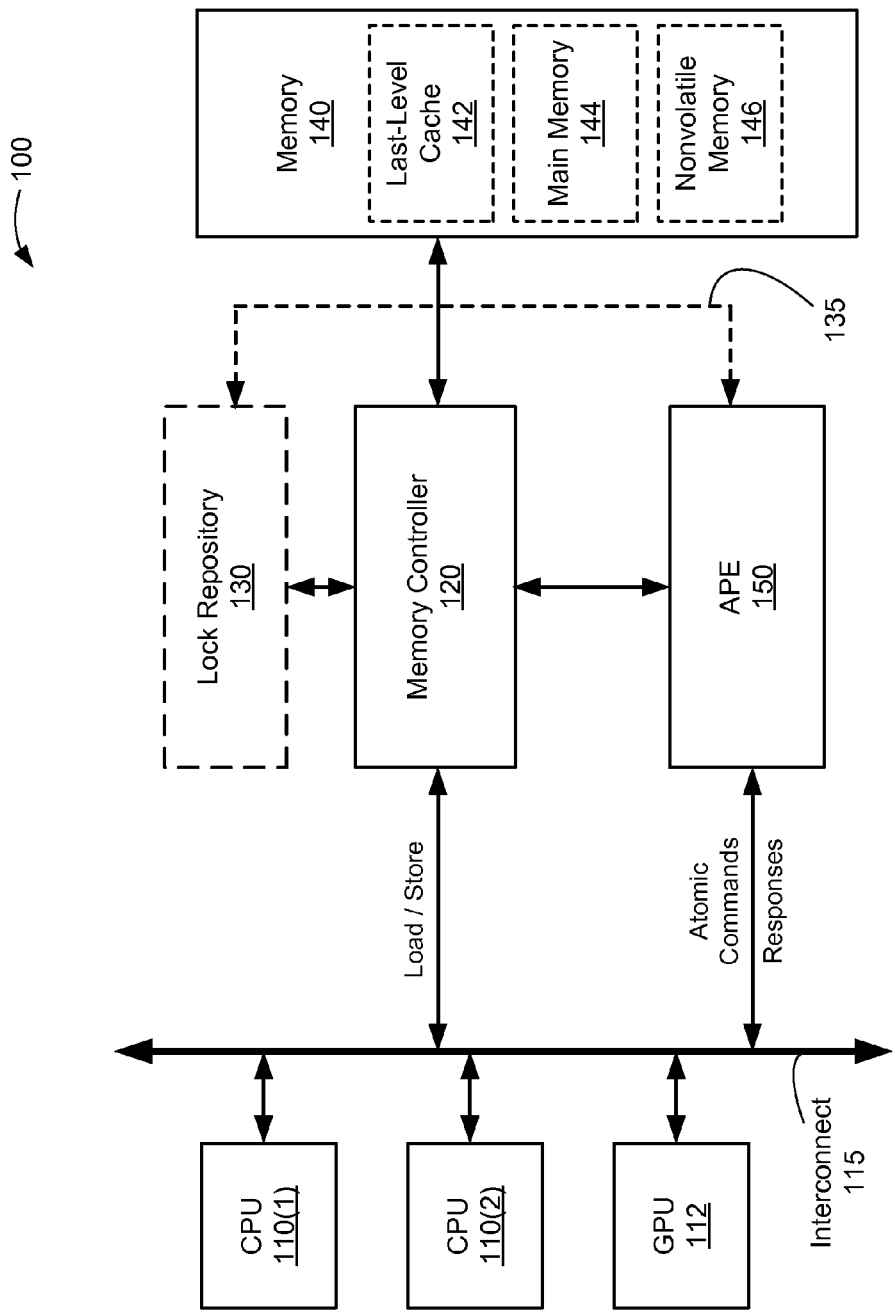

PROCESSING ENGINE FOR COMPLEX ATOMIC OPERATIONS

TECHNICAL FIELD

The present embodiments relate generally to computer processors, and specifically to processing engines coupled to multi-threaded and/or multicore processors.

BACKGROUND

In multi-threaded and/or multicore processors, a data structure may be shared between multiple threads and/or processor cores to allow multitasking on a common set of data while maintaining the consistency of the data. Such a data structure is referred to as a shared (or concurrent) data structure. A lock mechanism may be used to limit access to particular data element(s) of a shared data structure referenced by a section of program code when the section of code is being performed. Lock mechanisms may create a bottleneck that adversely affects overall system throughput and may result in deadlock. While fine-grained sections can be constructed at the programming level to alleviate this bottleneck by allowing different portions of a data structure to be locked independently, such construction involves significant programming time and effort.

SUMMARY

In some embodiments, a system includes an atomic processing engine (APE) coupled to an interconnect. The interconnect is to couple to one or more processor cores. The APE is to receive a plurality of commands from the one or more processor cores through the interconnect and, in response to a first command of the plurality of commands, perform a first plurality of operations associated with the first command. The first plurality of operations references multiple memory locations, at least one of which is shared between two or more threads executed by the one or more processor cores.

In some embodiments, a method includes executing a plurality of threads on one or more processor cores. The method also includes, in an atomic processing engine (APE), receiving a first command from one of the one or more processor cores and performing a first plurality of operations associated with the first command. The first plurality of operations references multiple memory locations, at least one of which is shared between two or more threads of the plurality of threads.

In some embodiments, a non-transitory computer-readable storage medium stores instructions, which when executed by a respective processor core of one or more processor cores, cause the respective processor core to issue a command to an atomic processing engine to perform a plurality of operations referencing multiple memory locations, at least one of which is shared between a plurality of threads to be executed by the one or more processor cores.

BRIEF DESCRIPTION OF THE DRAWINGS

The present embodiments are illustrated by way of example and are not intended to be limited by the figures of the accompanying drawings.

FIG. 1 is a functional block diagram illustrating a multi-processor system equipped with an atomic processing engine (APE) in accordance with some embodiments.

Like reference numerals refer to corresponding parts throughout the figures and specification.

DETAILED DESCRIPTION

Figure 2A:
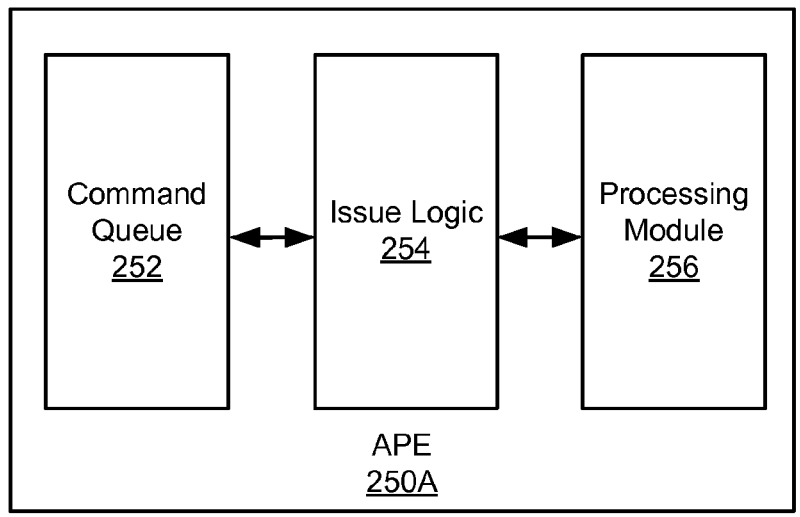
FIG. 2A is a functional block diagram illustrating the APE of FIG. 1 in accordance with some embodiments.

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

FIG. 1 is a functional block diagram illustrating a multi-processor system 100 that includes an atomic processing engine (APE) 150 in accordance with some embodiments. System 100 has a plurality of processor cores including, for example, a plurality of central processing units (CPUs) 110(1)-110(2) and a graphics processing unit (GPU) 112. CPUs 110(1)-110(2) may be general-purpose processors or may be application-specific integrated circuitry that provides arithmetic and control functions to system 100. GPU 112 may include processing circuits or cores to handle or assist CPUs 110(1)-110(2) in handling graphics generation and video outputs. CPUs 110(1)-110(2) and GPU 112 may each include a dedicated cache memory (not shown for simplicity). CPUs 110(1)-110(2) and GPU 112 are coupled to an interconnect 115 for data communication within system 100.

Interconnect 115 (e.g., a bus) couples the CPUs 110(1)-110(2) and GPU 112 to APE 150 and a memory controller 120. Memory controller 120 is coupled between interconnect 115 and memory 140 to provide CPUs 110(1)-110(2) and GPU 112 with access to data stored in memory 140 via interconnect 115. In some embodiments, memory 140 includes a last-level cache memory 142, main memory 144, and/or non-volatile memory 146 (e.g., a hard-disk drive or solid-state drive). In some examples, last-level cache memory 142 is implemented using SRAM, main memory 144 is implemented using DRAM, and non-volatile memory 146 is implemented using Flash memory or one or more magnetic disk drives. In other examples, memory 140 may include one or more levels implemented using a non-volatile memory technology such as phase-change memory (PCM), magnetoresistive random-access memory (MRAM) (e.g., spin transfer torque MRAM or STT-MRAM), or memresistor-based memory, and may include hybrids of different memory technologies. Other examples are possible. Memory 140 is an abstract representation of a storage environment. According to some embodiments, memory 140 may include one or more memory chips or modules.

CPUs 110(1)-110(2) and GPU 112 may execute a plurality of threads that operate on data stored in memory 140. Each of the CPUs 110(1)-110(2) and GPU 112 may execute a separate thread; also, one or more (e.g., all) of the CPUs 110(1)-110(2) and GPU 112 may execute multiple threads. Data stored in memory 140 may be shared among the plurality of threads. Data structures stored in memory 140 that include data shared among multiple threads are referred to as shared data structures. Examples of shared data structures include, but are not limited to, singly-linked lists, doubly-linked lists, hash tables, arrays, binary trees, B-trees, and objects and their pointers.

APE 150 is coupled to interconnect 115 to receive atomic commands from CPUs 110(1)-110(2) and/or GPU 112. In some embodiments, when a processor core (e.g., CPU 110(1) or CPU 110(2), GPU 112, or a core within GPU 112) issues a command, it sends the command to either memory controller 120 or APE 150 by putting the command on the interconnect 115. Interconnect 115 routes non-atomic commands (e.g., single-instruction commands such as load/store) to memory controller 120 and atomic commands to APE 150 for processing. In response to receiving an atomic command, APE 150 performs a plurality of operations associated with the command.

Atomic commands may include simple atomic commands and complex atomic commands. (Atomic commands are referred to as atomic because they are issued as a single command by a processor core, even though their performance involves execution of multiple operations by APE 150. Atomic commands appear to be executed in a single step from the perspective of the issuing processor core and all other processor cores, but may be executed in multiple steps from the perspective of APE 150.) Simple atomic commands are associated with a sequence of operations to be performed by APE 150 that only reference a single memory location. For example, atomic operations such as "compare and swap," "test and set," and "increment" are simple atomic commands. Complex atomic commands are associated with a sequence of operations to be performed by APE 150 that reference multiple memory locations (e.g., in a shared data structure). For example, atomic commands such as "enqueue onto a linked list" and "relocate an object and all associated pointers to that object" are complex atomic commands. APE 150 allows these operations to be performed in response to a single command from a processor core. In some embodiments, APE 150 may receive a complex atomic command to execute a program that references multiple memory locations (e.g., in a shared data structure). In some embodiments (e.g., in which APE 150 includes a microcontroller), the sequence of operations for an atomic command is determined by a programmable or configurable set of instructions.

System 100A optionally includes a lock repository 130 that maintains a list of locked memory locations. Lock repository 130 is coupled to memory controller 120 and APE 150. In some embodiments, APE 150 is coupled to lock repository 130 through memory controller 120; alternatively, APE 150 is coupled to lock repository 130 through a direct connection 135 (e.g., a signal line or bus). Lock repository 130 allows the memory controller 120 and APE 150 to obtain locks on memory locations in memory 140 to be accessed in response to commands received from the CPUs 110(1)-110(2) and/or GPU 112 (e.g., load or store commands provided to memory controller 120, or atomic commands provided to APE 150). To obtain a lock on a memory location, memory controller 120 or APE 150 provides the location to lock repository 130, which adds the location to its list of locked memory locations. Memory controller 120 or APE 150 may then access the location in memory 140. Once the operation involving this access is complete, memory controller 120 or APE 150 releases the lock by instructing lock repository 130 to delete the location from its list. If memory controller 120 or APE 150 attempts to obtain a lock on a memory location in memory 140 that is already locked, lock repository 130 informs memory controller 120 or APE 150 that the location is locked. Memory controller 120 or APE 150 is thus prevented from accessing the location at that time.

In some embodiments, lock repository 130 is implemented using content-addressable memory (CAM) that stores locked locations in respective entries. The CAM may be searched to determine whether a desired location is locked, using the desired location as a search key; a match indicates that the desired location is locked. In some embodiments, lock repository 130 is implemented using a Bloom filter.

In some embodiments, system 100 includes multiple memory controllers 120, each coupled to APE 150 and lock repository 130. Lock repository 130 may be partitioned such that each memory controller 120 maintains a lock repository for memory addresses associated with that memory controller 120.

APE 150 thus supports autonomous execution of complex atomic operations. In some embodiments, complex atomic commands are issued in a "fire-and-forget" manner: the processor core issuing the command assumes the command is executed. Alternatively, APE 150 may provide a response notifying the processor core of completion of the command. APE 150 saves programmers from explicitly managing acquisition and release of locks for updates to shared data structures, thus reducing programming complexity.

In some embodiments, APE 150 performs an operation on a memory location, the content of which is cached in one or more processors (e.g., in a cache memory in CPU 110(1) or 110(2) or GPU 112) in system 100. APE 150 may issue cache snoop, flush, and/or invalidate instructions to update these caches affected by the operation via interconnect 115. Similarly, APE 150 may read data from one or more of these caches.

In some embodiments, APE 150 runs at a higher clock frequency than other components of system 100, because it acts as a point of serialization.

In some embodiments, APE 150 is implemented on the same integrated circuit as the CPUs 110(1)-110(2) and/or GPU 112, which integrated circuit may also include memory controller 120, lock repository 130, and/or at least a portion of memory 140 (e.g., last-level cache 142). Alternatively, APE 150 may be implemented on a separate integrated circuit from the CPUs 110(1)-110(2), GPU 112, and/or memory 140. For example, APE 150 may be implemented on a Northbridge chip that also includes memory controller 120 and lock repository 130. In another example, APE 150 may be implemented as a standalone integrated circuit in system 100. In some embodiments, APE 150 is implemented in a logic die on which one or more memory die of memory 140 are vertically stacked in a single package. In some other embodiments, APE 150 is implemented on an interposer die on which one or more logic die (e.g., a vertical stack of logic die) are mounted alongside one or more memory die (e.g., a vertical stack of memory die) in a single package. The logic die may include the CPUs 110(1)-110(2) and/or GPU 112. The memory die may include all or a portion of memory 140.

The configuration of system 100 shown in FIG. 1 is merely an example. System 100 may include more than two CPUs 110(1)-110(2), more than one GPU 112, and/or additional processing units coupled to interconnect 115 to perform operations on data stored within memory 140. Furthermore, APE 150 may be integrated into other suitable kinds of computing devices including, for example, accelerated processing units (APUs), field-programmable gate arrays (FPGAs), digital signal processors (DSPs), or other devices with microprocessors.

FIG. 2A is a functional block diagram illustrating an APE 250A that is an example of the APE 150 of FIG. 1 in accordance with some embodiments. APE 250A includes a command queue 252, issue logic 254, and a processing module 256. Command queue 252 stores atomic commands received by APE 250A from processor cores (e.g., CPUs 110(1)-110(2) and/or GPU 112, FIG. 1) through interconnect 115 (FIG. 1). Issue logic 254 includes logic circuitry to determine whether and when a command buffered in the command queue 252 may issue and be executed. In some embodiments, issue logic 254 determines whether respective commands buffered in the command queue 252 are executed in series or in parallel and determines whether respective commands may be fused or otherwise combined to eliminate redundancies. Processing module 256 executes issued commands by performing operations that correspond to respective commands. A respective command specifies a set of operations to be performed by processing module 256.

Figure 2B:
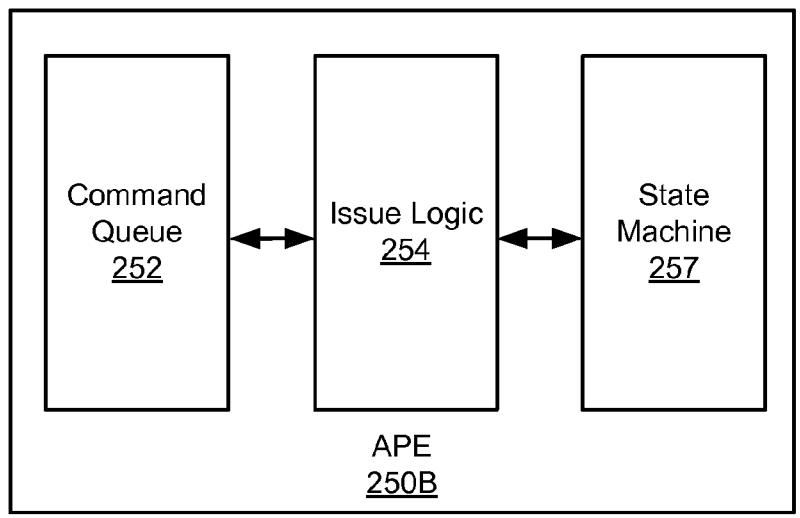
FIGS. 2B and 2C are functional block diagrams illustrating examples of the APE of FIG. 2A in accordance with some embodiments.

In some embodiments, the processing module 256 is implemented as a state machine 257, as shown for APE 250B in FIG. 2B in accordance with some embodiments. In some embodiments, the processing module 256 is implemented as a micro-controller 258, as shown for APE 250C in FIG. 2C in accordance with some embodiments. Micro-controller 258 may include a cache memory 260 (FIG. 2C) to store instructions and/or data. APE 250B and APE 250C are examples of APE 250A (FIG. 2A) and thus of APE 150 (FIG. 1). APE 150 may include both a state machine 257 and a microcontroller 258, and may include two or more state machines 257 and/or two or more microcontrollers 258. APE 250C (or another APE 150 with one or more microcontrollers 258) may receive and execute an atomic command that includes an instruction to execute a program that references multiple memory locations of a shared data structure. The atomic command may include the program or a pointer to the program as stored in memory 140 (FIG. 1). Micro-controller 258 executes the program, which may be cached in cache 260.

APE 150 executes complex atomic commands (and in some embodiments, simple atomic commands) in an autonomous fashion. In some embodiments, upon receiving a complex atomic command, APE 150 determines whether or not one or more (e.g., all) of the multiple memory locations referenced by a plurality of operations associated with the command are locked before performing the plurality of operations. For example, APE 150 attempts to obtain locks on the one or more memory locations from lock repository 130 (FIG. 1). If any of the one or more memory locations are already locked, as indicated by lock repository 130, then APE 150 releases any locks that were already obtained for the command and holds the command in command queue 252 (FIGS. 2A-2C) without executing it. The command is held in command queue 252 until APE 150 is able to obtain locks on all of the one or more memory locations. For example, APE 150 periodically attempts to obtain these locks from lock repository 130. Once the locks are obtained, issue logic 254 (FIGS. 2A-2C) allows the command to issue and processing module 256 (FIG. 2A) performs the plurality of operations. Once the plurality of operations has been performed, the locks are released. Other commands (e.g., other atomic commands stored in command queue 252, or load/store commands provided to memory controller 120, FIG. 1,) that reference a locked memory location are blocked from execution until the lock is released.

Alternatively, if APE 150 determines that a memory location referenced by the plurality of operations corresponding to an atomic command is already locked, APE 150 aborts the plurality of operations (thus aborting the command) and sends a failure message via interconnect 115 to the processor core (e.g., CPU 110(1) or 110(2) or GPU 112) that issued the command. Such embodiments allow processor cores, threads, processes, and/or applications to determine retry policies and to provide parameters specifying the maximum number of commands that may be queued in command queue 252. These parameters may reflect considerations such as resource costs of executing the commands and quality-of-service. For example, system 100 may be designed to avoid commands for high-priority processes being stalled or delayed indefinitely behind queued-up atomic commands from low-priority processes. In some such embodiments, all shared memory locations that are involved in an atomic operation are to be locked before APE 150 changes any of its control states and begins performance of the atomic operation. APE 150 thus detects any failure to obtain a lock before changing any of its control states. When a command is aborted, all locked locations held by the aborted command are released before APE 150 signals the failure to the requesting processor core.

In some implementations, APE 150 supports both stalling and aborting in response to failure to obtain a lock. Whether to stall or abort may be determined selectively by applying a policy based, for example, on the type of operation, the identity of the requestor (e.g., a processor core, thread, process, or application identity), the number of queued commands in the command queue 252, or other suitable criteria. APE 150 thus may determine whether to stall or abort a command based on whether one or more predefined criteria are satisfied.

According to some embodiments, APE 150 allows multiple commands to be simultaneously executed when possible, so that execution of an atomic command in system 100 may begin without waiting for completion of other atomic commands being executed (or "in flight"). For example, issue logic 254 (FIGS. 2A-2C) determines whether two atomic commands received by APE 150 (e.g., as stored in command queue 252) that reference a shared data structure reference distinct portions of the shared data structure or not. If the two commands (i.e., the pluralities of operations corresponding to the two commands) reference distinct portions of the shared data structure, issue logic 254 allows the two commands to issue in parallel (either simultaneously, or such that a second one of the two commands issues before the first is complete) and the processing module 256 (FIG. 2A) performs the operations corresponding to the two commands in parallel. However, if the first plurality of operations and the second plurality of operations reference a common portion of the shared data structure, the issue logic 254 does not allow the second command to issue until execution of the first command by the processing module 256 is complete, such that the first and second commands are executed serially. In this way, APE 150 provides the capability of parallel updates to a shared data structure in a multiprocessor system, thereby increasing efficiency and throughput of system 100.

In some embodiments, issue logic 254 (FIGS. 2A-2C) may also identify a redundancy between a first plurality of operations for a first atomic command and a second plurality of operations for a second atomic command. APE 150 may then fuse execution of the first and second pluralities of operations to eliminate the redundancy. For example, if APE 150 receives two commands to append items to the same linked list, it may save and reuse the position of the end of the linked list after appending the first item, and then append the second item to that position, thus avoiding re-traversing the list or re-accessing the tail pointer and reducing the total number of operations to be performed.

In some embodiments, APE 150 serializes all accesses to a shared data structure, for example by queuing the corresponding commands in command queue 252 (FIG. 2A) and issuing the commands serially, such that processing module 256 executes the operations for a single atomic command at a time. For example, command queue 252 is implemented as a first-in-first-out (FIFO) buffer with an input to received commands from interconnect 115 (FIG. 1) and an output to issue commands serially. In such embodiments, the system 100 may not include lock repository 130, because the serialization performed by APE 150 avoids contention, ensuring that parallel attempts to access a share data structure (or portion thereof) do not occur.

In some embodiments, APE 150 performs compound atomic operations across multiple memory locations in a shared data structure. For example, APE 150 performs vector versions of simple atomic operations in response to a single command received from a processor core (e.g., CPU 110(1) or 110(2) or GPU 112). In one example, APE 150 performs repeated atomic test-and-set operations across an array (e.g., across the entire array). The repeated operations may be performed as a single massive atomic operation during which the entire array is locked, or as successive individual atomic operations for which locks on respective array elements are successively obtained and released. In the latter case, other operations may access unlocked parts of the array while the successive individual atomic operations are being performed.

Figure 3A:
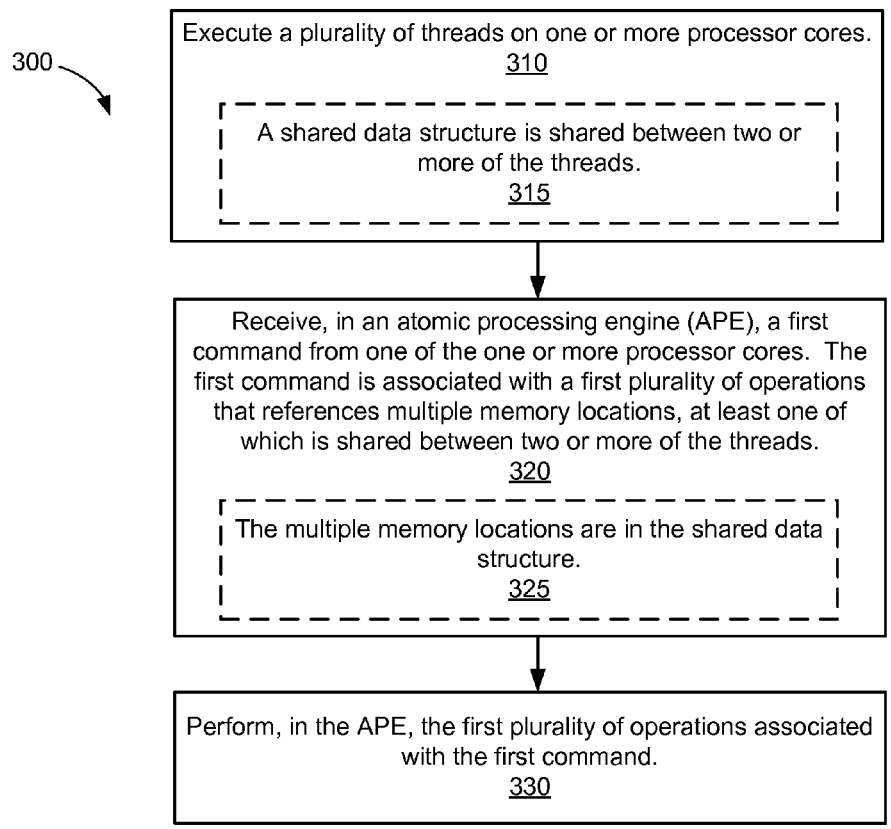
FIG. 3A is a flowchart depicting a method for performing atomic operations in accordance with some embodiments.

FIG. 3A is a flowchart depicting a method 300 for performing atomic operations in accordance with some embodiments. The method 300 is performed, for example, in the system 100 (FIG. 1).

One or more processor cores (e.g., CPUs 110(1)-110(2) and/or GPU 112, FIG. 1) execute (310) a plurality of threads. In some embodiments, a shared data structure is shared (315) between two or more of the threads. Examples of the shared data structure include, but are not limited to, a singly-linked list, a doubly-linked list, a hash table, an array, a binary tree, a B-tree, and an object and its pointers.

APE 150 (e.g., APE 250A, 250B, or 250C, FIGS. 2A-2C) receives (320) a first command from one of the one or more processor cores (e.g., CPU 110(1) or 110(2) or GPU 112, FIG. 1). The first command is associated with a first plurality of operations that references multiple memory locations, at least one of which is shared between two or more of the threads. In some embodiments, the multiple memory locations (or a portion thereof) are located (325) in the shared data structure. APE 150 (e.g., processing module 256, FIG. 2A) performs (330) the first plurality of operations associated with the first command. APE 150 thus accesses the multiple memory locations (e.g., in the memory 140, FIG. 1) while performing (330) the first plurality of operations associated with the first command.

Figure 3B:
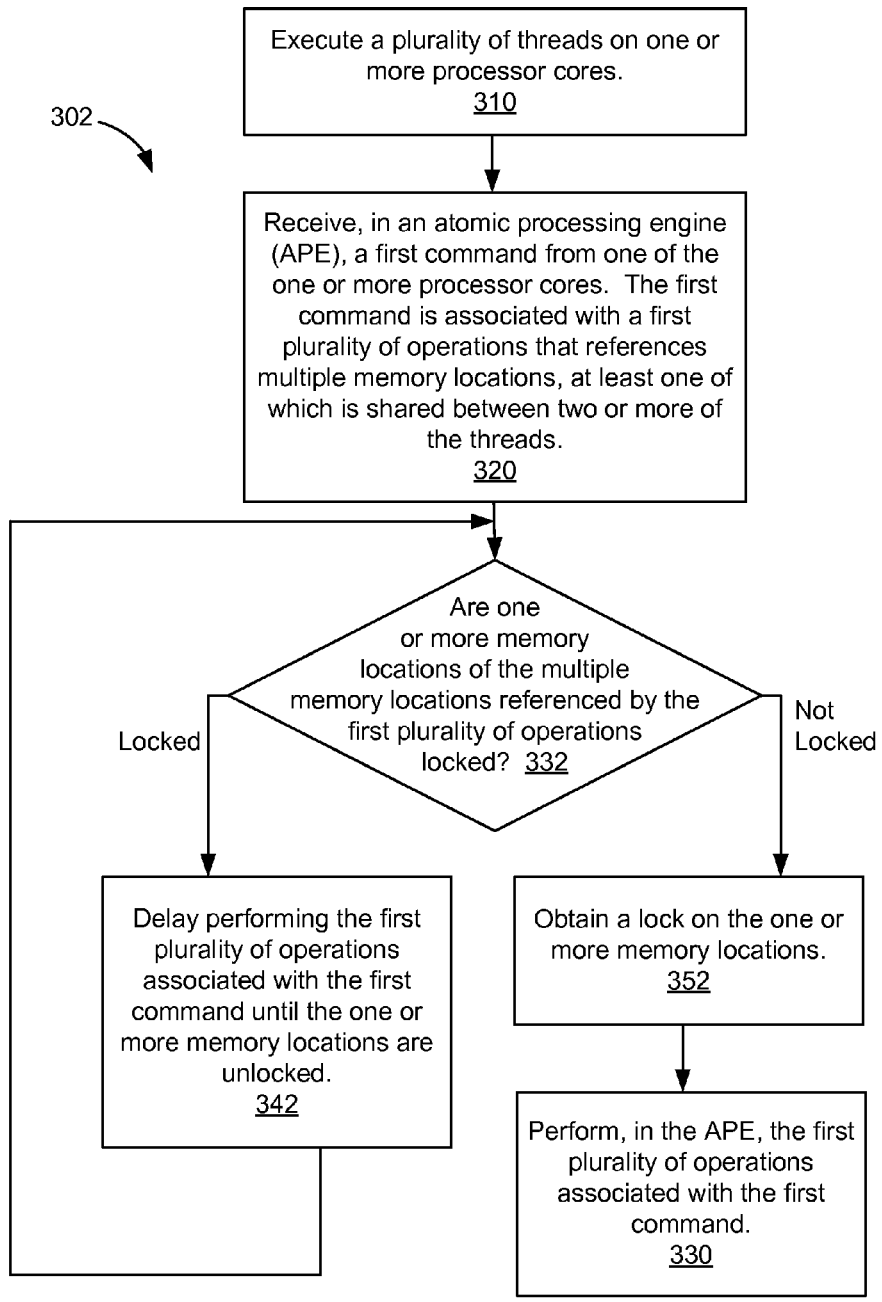
FIG. 3B is a flowchart depicting further details of the method of FIG. 3A in accordance with some embodiments.

FIG. 3B is a flowchart of a method 302 that depicts further details of the method 300 of FIG. 3A in accordance with some embodiments. The operations 310 and 320 are performed as described for the method 300 (FIG. 3A). After operation 320, APE 150 determines (332) if one or more memory locations of the multiple memory locations referenced by the first plurality of operations are locked or not. For example, APE 150 attempts to obtain locks on the one or more memory locations from lock repository 130 (FIG. 1) or queries lock repository 130 to determine if the one or more memory locations are locked.

In response to a determination that the one or more locations are locked, APE 150 delays (342) performing the first plurality of operations associated with the first command until the one or more memory locations are unlocked. For example, APE 150 stores the first command in command queue 252 (FIGS. 2A-2C), thereby stalling the first command.

Conversely, in response to a determination that the one or more locations are not locked, APE 150 obtains (352) one or more respective locks on the one or more locations from lock repository 130 (FIG. 1). Once the one or more memory locations are locked, APE 150 performs (330) the first plurality of operations associated with the first command, as described for the method 300 (FIG. 3A).

Figure 4A:
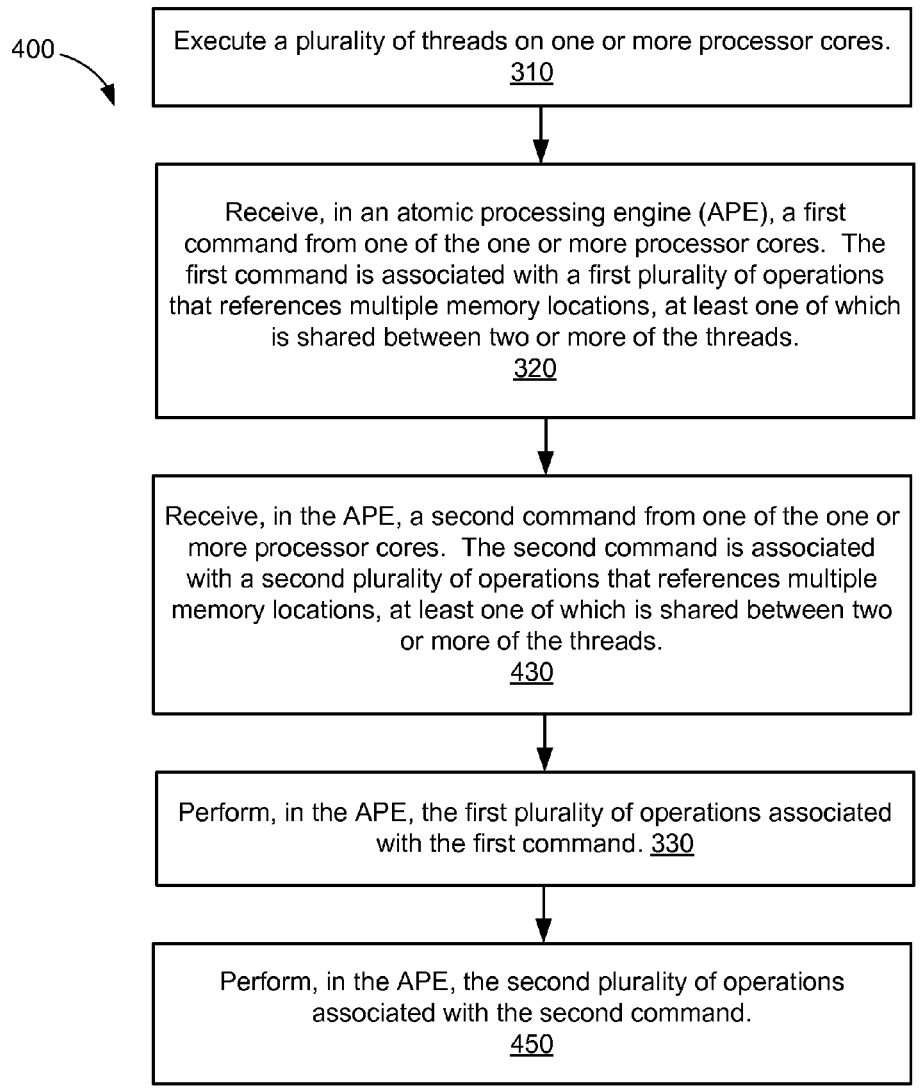
FIGS. 4A-4C are flowcharts depicting methods of performing multiple atomic operations in accordance with some embodiments.

FIG. 4A is a flowchart depicting a method 400 for performing multiple atomic operations in accordance with some embodiments. The method 400 is performed, for example, in the system 100 (FIG. 1).

Figure 2C:
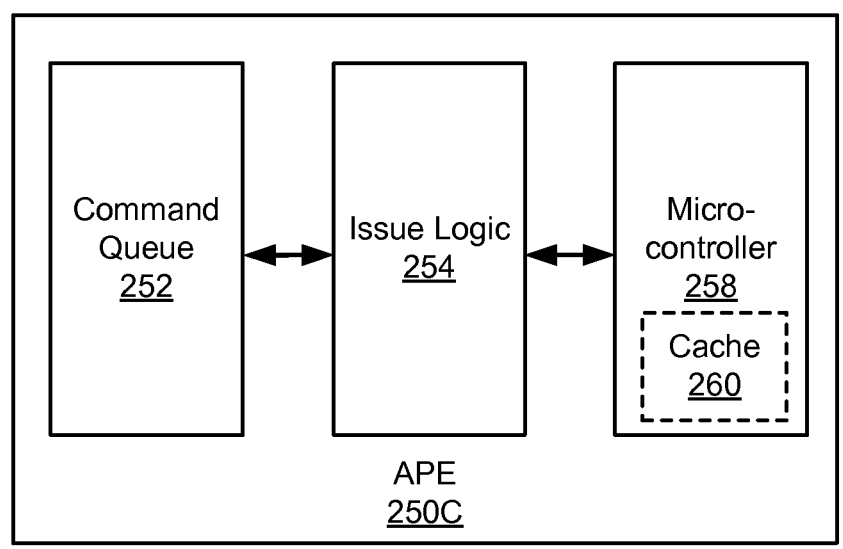

In the method 400, operations 310 and 320 are performed as described for the method 300 (FIG. 3A). In addition to receiving (320) the first command, APE 150 receives (430) a second command from one of the one or more processor cores (e.g., CPU 110(1), CPU 110(2), or GPU 112, FIG. 1). The second command is associated with a second plurality of operations that references multiple memory locations, at least one of which is shared between two or more of the threads. In some embodiments, the multiple memory locations referenced by the first plurality of operations and the multiple memory locations reference by the second plurality of operations are located in a shared data structure (e.g., the shared data structure of operation 315, FIG. 3A.) The processor core from which the second command is received may be the same as or different than the processor core from which the first command is received. In some embodiments, the first and second commands are stored in command queue 252 (FIGS. 2A-2C).

APE 150 performs (330) the first plurality of operations associated with the first command, as described for the method 300 (FIG. 3A). APE 150 (e.g., processing module 256, FIG. 2A) then performs (450) the second plurality of operations associated with the second command. The memory locations referenced by the second plurality of operations may overlap with the memory locations referenced by the first plurality of operations or may be located in a common portion of the shared data structure.

The method 400 illustrates serialization of atomic commands by APE 150, thereby avoiding contention for the shared memory structure.

Figure 4B:
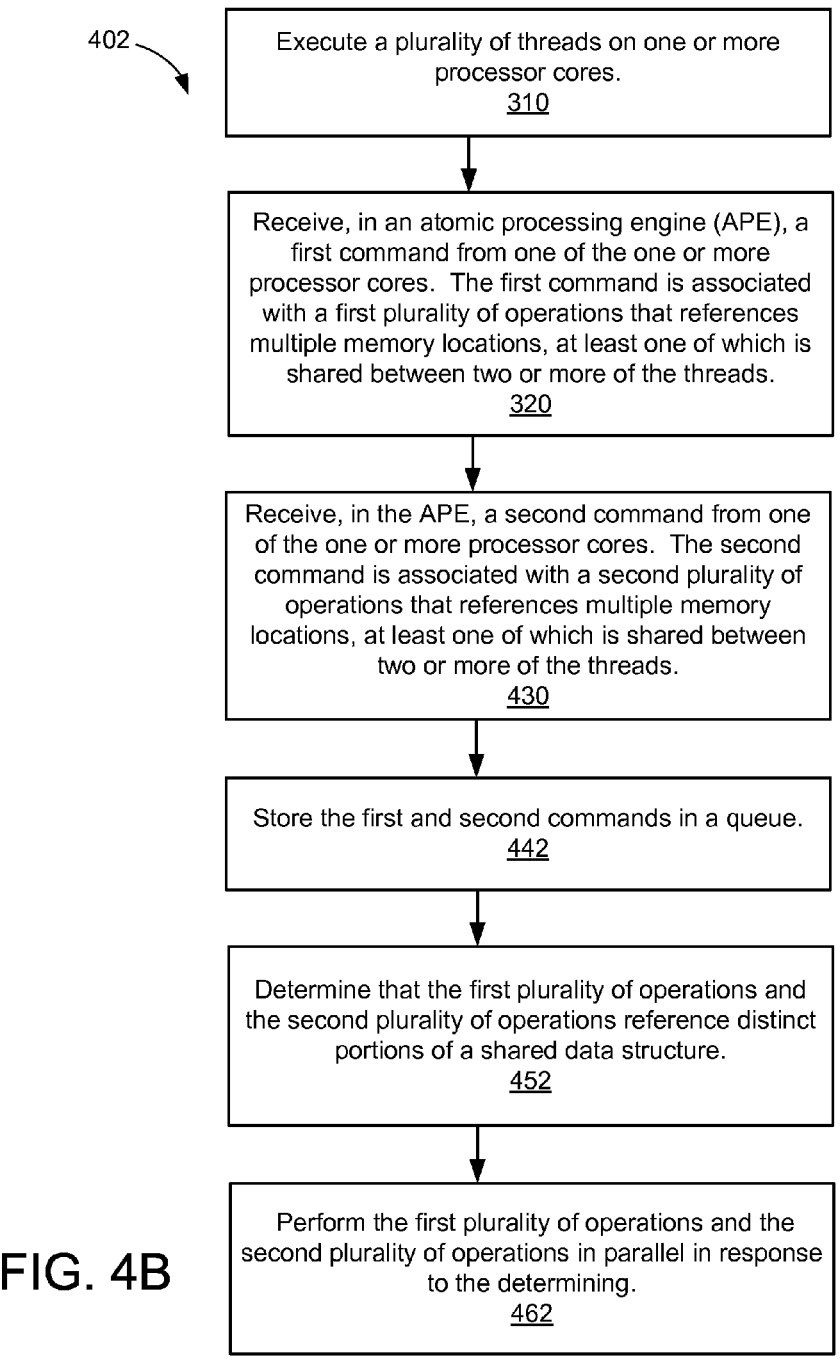

FIG. 4B is a flowchart of a method 402 for performing multiple atomic operations in accordance with some embodiments. The method 402 is performed, for example, in the system 100 (FIG. 1).

In the method 402, operations 310 and 320 are performed as described for the method 300 (FIG. 3A). In addition to receiving (320) the first command, APE 150 receives (430) a second command from one of the one or more processor cores, as described for the method 400 (FIG. 4A).

APE 150 stores (442) the first and second commands in a queue (e.g., command queue 252, FIGS. 2A-2C). Using issue logic 254 (FIGS. 2A-2C), APE 150 determines (452) that the first plurality of operations and the second plurality of operations reference distinct portions of the shared data structure. In response to a determination that the first and second pluralities of operations reference distinct portions of the shared data structure, APE 150 executes the second command in parallel with the first command: issue logic 254 allows the first and second commands to issue in parallel, and processing module 256 (FIG. 2A) (e.g., state machine 257 or microcontroller 258, FIGS. 2B-2C) performs (462) the first plurality of operations associated with the first command and the second plurality of operations associated with the second command in parallel. In some embodiments, APE 150 obtains locks on the distinct portions of the shared data structure referenced by the first and second pluralities of operations from lock repository 130 (FIG. 1) before performing the first and second pluralities of operations.

If instead of determining (452) that the first plurality of operations and the second plurality of operations reference distinct portions of the shared data structure, APE 150 (e.g., issue logic 254, FIGS. 2A-2C) determines that the first plurality of operations and the second plurality of operations reference a common portion of the shared data structure, APE 150 may serialize execution of the first and second commands (e.g., as described for the method 400, FIG. 4A). Alternatively, APE 150 may combine execution of the first and second commands in a manner that reduces the total number of steps performed, as described in FIG. 4C.

Figure 4C:
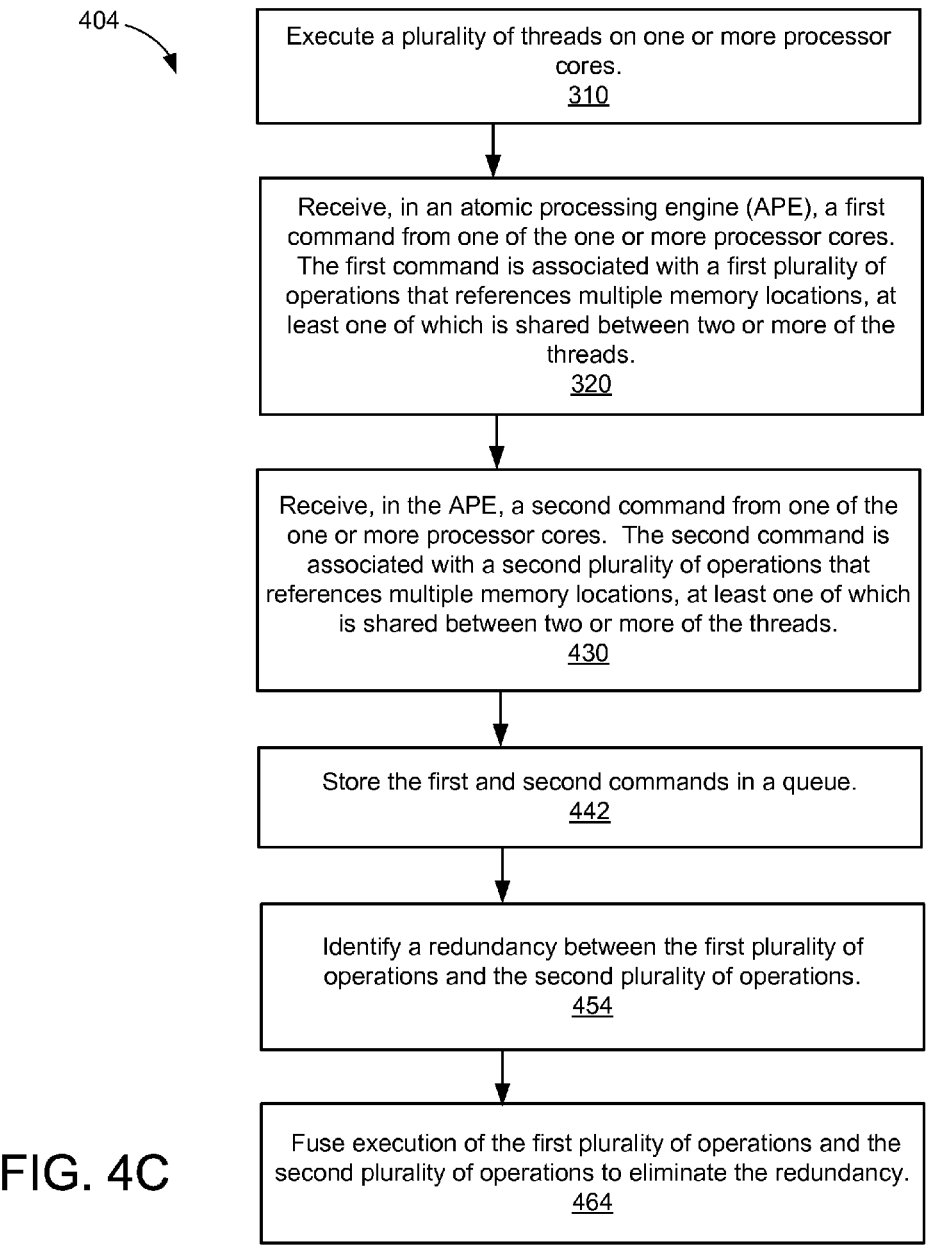

FIG. 4C is a flowchart of a method 404 for performing multiple atomic operations in accordance with some embodiments. The method 404 is performed, for example, in the system 100 (FIG. 1).

In the method 404, operations 310 and 320 are performed as described for the method 300 (FIG. 3A), and operations 430 and 442 are performed as described for the methods 400 and 402 (FIGS. 4A-4B).

APE 150 identifies (454) whether a redundancy exists between the first plurality of operations and the second plurality of operations (454). For example, issue logic 254 (FIGS. 2A-2C) determines whether separate execution of the first and second commands would involve repetition of an operation. If APE 150 identifies a redundancy, it fuses (464) execution of the first plurality of operations and the second plurality of operations to eliminate the redundancy. For example, issue logic 254 allows the first and second commands to issue from the command queue 252 in parallel and instructs the processing module 256 (FIG. 2A) to perform the first and second pluralities of operations in a manner that eliminates repetition of an operation.

In one example of the method 404, the first command is a command to append a first item to a linked list and the second command is a command to append a second item to the linked list. APE 150 fuses (464) execution of the first plurality of operations and the second plurality of operations by saving the position of the end of the linked list after appending the first item, and using the saved position to then append the second item to that position, thus avoiding re-traversing the list or re-accessing the tail pointer and reducing the total number of operations to be performed. For example, microcontroller 258 saves this position in cache 260 (FIG. 2C).

By respectively executing atomic commands in parallel and allowing execution of atomic commands to be combined, the methods 402 and 404 (FIGS. 4B-4C) increase efficiency and throughput of the system 100 (FIG. 1).

Figure 5A:
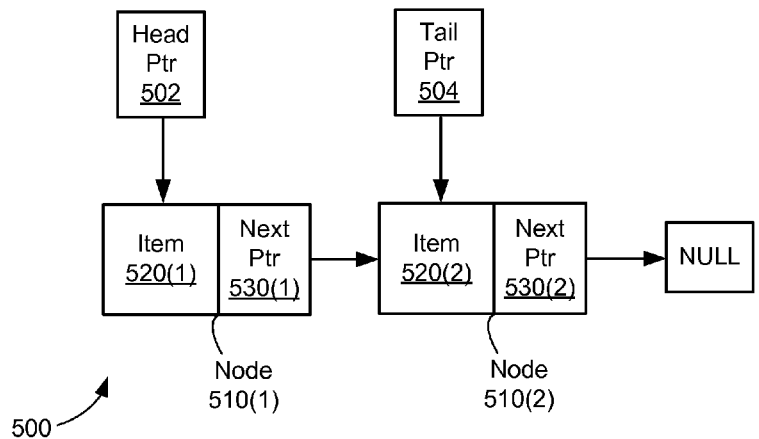
FIGS. 5A and 5B are diagrams illustrating a linked list.
Figure 5B:
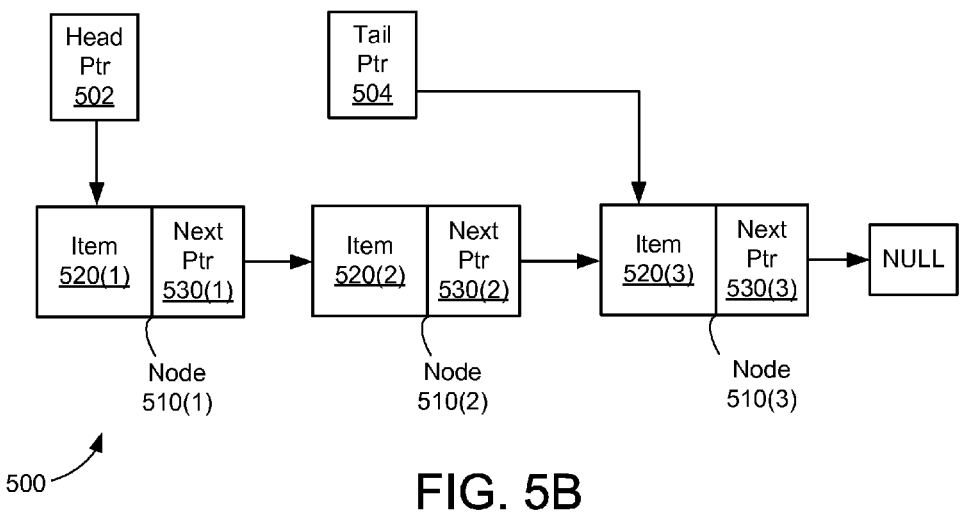

FIGS. 5A and 5B are diagrams illustrating a linked list 500, which is an example of a shared data structure and may be stored in memory 140 (FIG. 1). Linked list 500 is a singly linked list that includes a plurality of nodes linked together in a sequence. In the example of FIG. 5A, linked list 500 includes two nodes: a first node 510(1), which is designated as the head of the linked list 500, and a second node 510(2), which is designated as the tail of the linked list 500. A head pointer 502 points to the head 510(1) and a tail pointer 504 points to the tail 510(2). Each node of linked list 500 stores an item and a pointer ("next pointer"). The first node 510(1) stores a first item 520(1) and a pointer 530(1), which points to the second node 510(2). The second node 510(2) stores a second item 520(2) and a pointer 530(2). The pointer 530(2) is a null pointer, which indicates that the second node 510(2) is the tail.

In the example of FIG. 5B, a third item 520(3) has been added to, and thus enqueued in, linked list 500. Pointer 530(2) of the second node 510(2) is updated to point to a third node 510(3), which stores the third item 520(3). The third node 510(3) includes a pointer 530(3), which is set as a null pointer indicating that the third node 510(3) is now the tail of linked list 500. Tail pointer 504 is updated to point to the third node 510(3) instead of the second node 510(2).

Figure 5C:
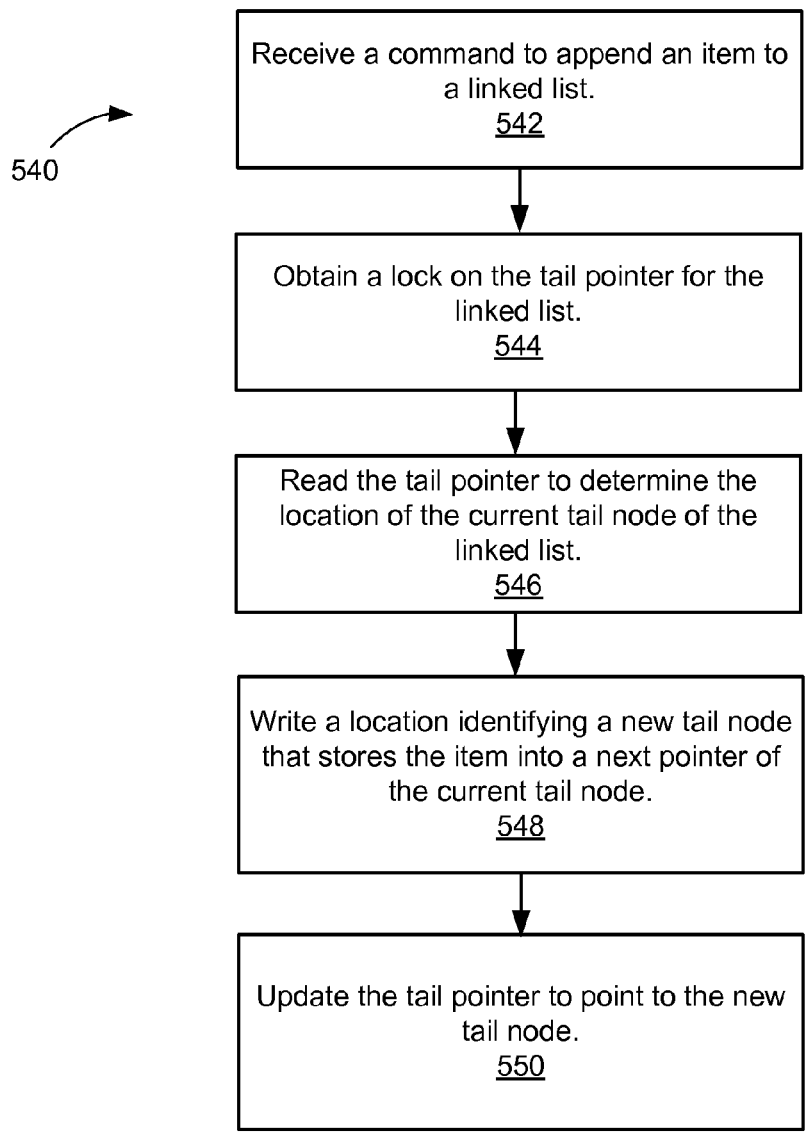
FIG. 5C is a flowchart depicting a method of appending an item to the linked list of FIGS. 5A-5B in response to a complex atomic command in accordance with some embodiments.

FIG. 5C is a flowchart depicting a method 540 of enqueuing the item 520(3) in linked list 500 (FIGS. 5A-5B) in response to a complex atomic command in accordance with some embodiments. The method 540 is performed, for example, in the system 100 (FIG. 1).

APE 150 receives (542) a command to append the item 520(3) to linked list 500 (FIGS. 5A-5B). In some embodiments, the command is received from a respective processor core (e.g., CPU 110(1) or 110(2) or GPU 112, FIG. 1). The command is an example of a first command received in an operation 320 (FIGS. 3A-3B, 4A-4C) or a second command received in an operation 430 (FIGS. 3B, 4A-4C). In some embodiments, APE 150 stores the command in command queue 252 (FIGS. 2A-2C).

In some embodiments, APE 150 obtains a lock (544) on tail pointer 504 from lock repository 130 (FIG. 1). If tail pointer 504 is already locked (e.g., is already listed in lock repository 130), APE 150 may stall execution of the command until a lock is obtained or may abort execution of the command and return a failure message to the processor core that issued the command. The operation 544 is an example of the operation 352 (FIG. 3B).

APE 150 reads (546) tail pointer 504, which stores the location of the current tail node 510(2) (FIG. 5A). APE 150 writes (548) the location of a new tail node 510(3) (FIG. 3) into the pointer 530(2) of node 510(2), so that node 510(2) now points to the new tail node 510(3). The new tail node 510(3) stores the item 520(3) being appended to linked list 500. APE 150 updates (550) tail pointer 504 to point to the new tail node 510(3).

In some embodiments, APE 150 then releases the lock obtained on the tail pointer 504. Item 530(2) has now been enqueued in linked list 150, in response to a single complex atomic command.

In some embodiments, APE 150 also sends a completion message (e.g., via interconnect 115) to the processor core that issued the command. Alternatively, the command is a "fire-and-forgot" command and no completion message is sent.

While methods 300, 302, 400, 402, 404, and 540 (FIGS. 3A-3B, 4A-4C, and 5C) include a number of operations that are depicted as performed in a specific order, it is noted that these methods may include more or fewer operations, which can be performed in serial or in parallel. An order of two or more operations may be changed, performance of two or more operations may overlap, and two or more operations may be combined into a single operation. For example, the operation 310 (FIGS. 3A-3B, 4A-4C) may be performed in an on-going manner while other operations are performed. Furthermore, the methods 300, 302, 400, 402, 404, and/or 540 may be combined (e.g., into a single method).

In some embodiments, a portion of memory 140 (FIG. 1) stores instructions to issue complex atomic commands as described herein (e.g., the commands received in methods 300, 302, 400, 402, 404, and/or 540, FIGS. 3A-3B, 4A-4C, and 5C). For example, memory 140 includes a non-transitory computer-readable medium (e.g., in non-volatile memory 146, FIG. 1) storing instructions that, when executed by a respective processor core (e.g., CPU 110(1) or 110(2) or GPU 112) in system 100, cause the respective processor core to issue a command to APE 150 to perform a plurality of operations referencing multiple memory locations (e.g., in a shared data structure), including at least one memory location that is shared between two or more threads.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A system, comprising:
an interconnect to couple to one or more processor cores; and
an atomic processing engine (APE) coupled to the interconnect, the APE:
  receiving a plurality of commands from the one or more processor cores through the interconnect;
  comparing memory locations to be accessed during operations for two or more of the plurality of commands to determine whether at least one same memory location is to be accessed during the operations for the two or more of the plurality of commands;
  upon determining that at least one same memory location is to be accessed during the operations for the two or more of the plurality of commands, performing the operations for the two or more of the plurality of commands serially; and
  upon determining that no same memory location is to be accessed during the operations for the two or more of the plurality of commands, performing the operations for the two or more of the plurality of commands in parallel.

2. The system of claim 1, wherein the APE comprises a queue to serialize accesses to memory locations.

3. The system of claim 1, wherein the APE obtains locks on memory locations before performing corresponding operations.

4. The system of claim 3, wherein:
the APE comprises a queue to store the plurality of commands; and
the APE is to hold a given command in the queue in response to a failure to obtain a lock on a memory location referenced by the operations for the given command.

5. The system of claim 3, wherein:
the APE is to receive a given command from a first processor core of the one or more processor cores through the interconnect; and
the APE is to abort operations for the given command and send a failure message to the first processor core through the interconnect in response to a failure to obtain a lock on a memory location referenced by the operations for the given command.

6. The system of claim 3, further comprising a lock repository, coupled to the APE, to store a list of locked memory locations;
wherein the APE is to obtain the locks on the one or more memory locations from the lock repository before performing operations for a given command.

7. The system of claim 1, wherein a processing module that performs operations for the plurality of commands comprises one or more of a state machine and a microcontroller.

8. The system of claim 1, wherein the APE comprises:
a queue to store the plurality of commands;
issue logic to identify a redundancy between operations for two or more queued commands of the plurality of commands; and
a processing module to fuse execution of the operations for the two or more queued commands.

9. The system of claim 1, wherein:
a given command comprises an instruction to execute a program that references the multiple memory locations; and
the APE comprises a microcontroller to execute the program.

10. The system of claim 1, wherein:
the memory locations to be accessed during operations for the two or more of the plurality of commands are located in a shared data structure; and
the data structure is selected from the group consisting of a linked list, an array, a hash table, a binary tree, and a B-tree.

11. A method, comprising:
by an atomic processing engine (APE) that is connected via an interconnect to one or more processor cores:
  receiving a plurality of commands from the one or more processor cores through the interconnect;
  comparing memory locations to be accessed during operations for two or more of the plurality of commands to determine whether at least one same memory location is to be accessed during the operations for the two or more of the plurality of commands;
  upon determining that at least one same memory location is to be accessed during the operations for the two or more of the plurality of commands, performing the operations for the two or more of the plurality of commands serially; and
  upon determining that no same memory location is to be accessed during the operations for the two or more of the plurality of commands, performing the operations for the two or more of the plurality of commands in parallel.

12. The method of claim 11, further comprising:
using a queue in the APE to serialize accesses to memory locations.

13. The method of claim 11, further comprising:
obtaining, by the APE, locks on memory locations before performing corresponding operations.

14. The method of claim 13, further comprising:
storing, by the APE, the plurality of commands in a queue; and
holding, by the APE, a given command in the queue in response to a failure to obtain a lock on a memory location referenced by the operations for the given command.

15. The method of claim 13, further comprising:
receiving, by the APE, a given command from a first processor core of the one or more processor cores through the interconnect; and
aborting, by the APE, operations for the given command and send a failure message to the first processor core through the interconnect in response to a failure to obtain a lock on a memory location referenced by the operations for the given command.

16. The method of claim 13, further comprising maintaining, by the APE, a lock repository, the lock repository storing a list of locked memory locations; and
obtaining, by the APE, locks from the lock repository for one or more corresponding memory locations before performing operations for a given command.

17. The method of claim 11, wherein a processing module in the APE that performs operations for the plurality of commands comprises one or more of a state machine and a microcontroller.

18. The method of claim 11, further comprising:
storing, by the APE, two or more commands of the plurality of commands in a queue;
identifying, by the APE, a redundancy between operations for the two or more commands of the plurality of commands that are stored in the queue; and
fusing, by the APE, the operations for the two or more commands of the plurality of commands that are stored in the queue.

19. The method of claim 11, further comprising:
encountering, by the APE, a given command that comprises an instruction to execute a program that references the multiple memory locations; and
using, by the APE, a microcontroller to execute the program.

20. The method of claim 11, wherein:
the memory locations to be accessed during operations for the two or more of the plurality of commands are located in a shared data structure; and
the data structure is selected from the group consisting of a linked list, an array, a hash table, a binary tree, and a B-tree.

21. A non-transitory computer-readable storage medium storing instructions that, when executed by a processor in an atomic processing engine (APE) that is coupled via an interconnect to one or more processor cores, cause the processor to perform a method comprising:
receiving a plurality of commands from the one or more processor cores through the interconnect;
comparing memory locations to be accessed during operations for two or more of the plurality of commands to determine whether at least one same memory location is to be accessed during the operations for the two or more of the plurality of commands;
upon determining that at least one same memory location is to be accessed during the operations for the two or more of the plurality of commands, performing the operations for the two or more of the plurality of commands serially; and
upon determining that no same memory location is to be accessed during the operations for the two or more of the plurality of commands, performing the operations for the two or more of the plurality of commands in parallel.

* * * * *